United States Patent [19]

Mastromatteo

[11] 4,111,056
[45] Sep. 5, 1978

[54] CONTROL DEVICES

[76] Inventor: Michael Mastromatteo, 53B Ridge Rd., Valley Cottage, N.Y. 10989

[21] Appl. No.: 676,335

[22] Filed: Apr. 12, 1976

Related U.S. Application Data

[63] Continuation-in-part of Ser. No. 591,423, Jun. 30, 1975.

[51] Int. Cl.² ............................................. G01L 7/08
[52] U.S. Cl. ...................................... 73/706; 73/715;
137/557; 251/50; 251/54
[58] Field of Search ............... 73/395, 392, 406, 407,
73/706, 715; 137/557; 251/50, 54

[56] References Cited
U.S. PATENT DOCUMENTS

2,725,749  12/1955  Green .................................... 73/395

Primary Examiner—Donald O. Woodiel
Attorney, Agent, or Firm—Philip Furgang

[57] ABSTRACT

Disclosed is a control device for use in fluid systems. In one embodiment the fluid is a liquid. A substantially cylindrical housing has therein a symmetrical cavity. The cavity is divided in upper and lower chambers by a circular and planar diaphragm. The upper chamber housing wall has protruding therefrom a cylindrical boss having a port for admitting a liquid. The boss forms a valve seat. The diaphragm has a plurality of concentric corrugations surrounding a central planar integral valve member. A media port in the lower chamber housing admits media for putting pressure on the diaphragm. When the pressure exceeds a predetermined value, the valve member closes upon the seat and entraps liquid between the diaphragm and upper chamber housing. The liquid acts to cushion, conforming to the shape of the diaphragm, thereby preventing damage to the diaphragm.

6 Claims, 14 Drawing Figures

FIG. 14

CONTROL DEVICES

This is a continuation-in-part of application Ser. No. 591,423, filed June 30, 1975, now abandoned.

BACKGROUND OF THE INVENTION

This invention relates to devices intended to communicate pressure in fluid pressure operated devices. Thus, this invention is applicable to devices intended to transmit liquid or gas pressure, control the flow of liquids in hydraulic systems, prevent the extensive loss of liquids or gases in ruptured hydraulic or gaseous systems, and transmit pressure of liquids, solids, or gases to such liquid or gas operated instruments as pressure gauges, indicators, recorders, pressure transmitters, flow valves, or the like.

Controlling the flow or pressure of liquid in hydraulic systems can be troublesome. This may be particularly observed in systems in which a diaphragm is used to transmit the pressure exerted by some media (which may be a gas, liquid, or solid) to a liquid controlled instrument (such as a pressure gauge). In these systems, a diaphragm is secured within a housing cavity. The diaphragm divides the cavity into two separate chambers. The media (or so-called process media) communicates with the diaphragm through a port in the housing into one chamber. The other chamber is filled with a liquid and secured to and communicates through a port to the pressure measuring instrument. The pressure exerted by the process media may be transmitted to this so-called "solid filled" liquid system. Thus, systems of this type are generally referred to as solid (i.e., liquid) filled diaphragm seals. The most difficult problem faced in such systems is the maintenance of the integrity of the diaphragm. If the pressure is somehow lost on the instrument side, the process media may then exert too great a pressure upon the diaphragm, and the differential pressure will exceed the diaphragm spring rate, and the diaphragm will become distorted and the measuring accuracy of the diaphragm seal is lost. In addition, a diaphragm so distorted may, as a result, become ruptured, resulting in the loss of liquid fill and possible contamination of either the measuring instruments or the process media.

A number of devices have been suggested to overcome these problems. Thus, Bissell et al., in U.S. Pat. No. 3,202,063, suggests a diaphragm capsule or unit which comprises a backing member or plate having a rigid axial hub portion permanently united or welded to a diaphragm. The backing member and the diaphragm have corresponding corrugations or convolutions so as to provide a matching seat for the diaphragm to prevent distortion in the event of the loss of fill. This arrangement requires the special manufacture of a removable unit insertable within the housing cavity. The axial stem is provided with an O-ring, the seating of which must be done with precision. Furthermore, it is necessary to match the convolutions or corrugations of the back plate with the diaphragm corrugations.

Still another device has been suggested by Green, in U.S. Pat. No. 2,841,984, in which the corrugations or convolutions of the diaphragm are matched by corrugations in the housing wall itself. Here again, there is a problem of assembly including the matching of the convolutions.

Still another device which used a matching convolution in the diaphragm with those of the housing was taught by Bailous et al., in U.S. Pat. No. 2,833,995.

Still another approach was suggested by Hailer et al., in U.S. Pat. No. 2,667,184, in which two conduit members, for transmitting hydrostatic pressure, include flexible diaphragms covering each end and joined together to form the housing cavity with the two chambers. In this arrangement, the diaphragms abut one another, thereby sealing the line, but transmitting the hydrostatic pressure. However, because of the necessity of two abutting diaphragms, the diaphragms that are made of metal must be extremely thin and flexible or made of a rubber-like material. The interconnecting conduits are specified by Hailer et al. to be capillary in form and not adaptable to general hydraulic systems requiring large displacement of liquid and, in particular, those intended to measure the pressure of process media. Hailer et al. also suggests the use of a bleed port at the periphery of the cavity. However, common to other devices herein, if located immediately adjacent to the periphery, the diaphragm would become damaged.

Thus, the existing solutions to differential pressure placed upon a flexible diaphragm have been to either double-seal the chamber with matching facing diaphragms, thereby limiting the sensitivity and not inhibiting the possibility of rupture, or to match the convolutions of a more rigid diaphragm with the convolutions in the housing or those of a removable capsule to which the diaphragm is sealed. These latter arrangements introduce the problem of accurate alignment and assembly. The solution to the problems of diaphragm distortion due to loss of fill has led to an inventive device which is, in turn, applicable to devices having a wider area of usage as more generally referred to hereinabove.

SUMMARY OF THE INVENTION

It is an object of this invention to provide a diaphragm operated controlled device which prevents unnecessary distortion and rupturing of the diaphragm from excessive pressures.

It is another object of this invention to provide a diaphragm controlled device which is simple in construction and assembly and economical in manufacture.

It is still another object of this invention to provide a diaphragm controlled device, the principles of which are applicable to a wide range of hydraulic devices.

It is still a further object of this invention to provide a diaphragm control device which may be adapted to control pressure and flow of liquid therein, thereby providing a valve control system which also protects such systems from excessive loss of liquid upon rupture of such systems.

In accordance with the teachings of this invention, there is provided a control mechanism of the type employing liquids therein which comprises a housing means. The housing means has a cavity therein. Diaphragm means are secured within and divide the housing cavity into at least two chambers. At least one of these two chambers is adapted to receive the liquid. There is also provided liquid entrapping means within at least one of the chambers and so disposed that, upon a resultant force being applied in a predetermined direction and in excess of a predetermined magnitude against the diaphragm means, the entrapping means, as a result of the force, thereby entraps at least a part of the liquid within the one chamber so that the entrapped liquid prevents the diaphragm from being damaged by the force.

In still another embodiment of this invention, there is provided a control mechanism of the type having a fluid therein. The housing means, as before, has a cavity therein. The diaphragm means is secured within and divides the cavity into at least two chambers. At least one of the chambers is adapted to receive the fluid. The diaphragm means comprises an integral valve member while the housing has a valve seat in the one chamber intended to receive the fluid. A conduit port extends through that valve seat so as to admit the fluid into the chamber. The valve seat in combination with the valve member comprises the valve. The diaphragm is so disposed in dimension such that, upon a force moving the valve member into cooperation with the valve seat, the diaphragm is controllably deformed so as to permanently close the valve.

DESCRIPTION OF THE PREFERRED EMBODIMENTS

Figures 1, 2, 3, 4, 5, 6, 9, 10:
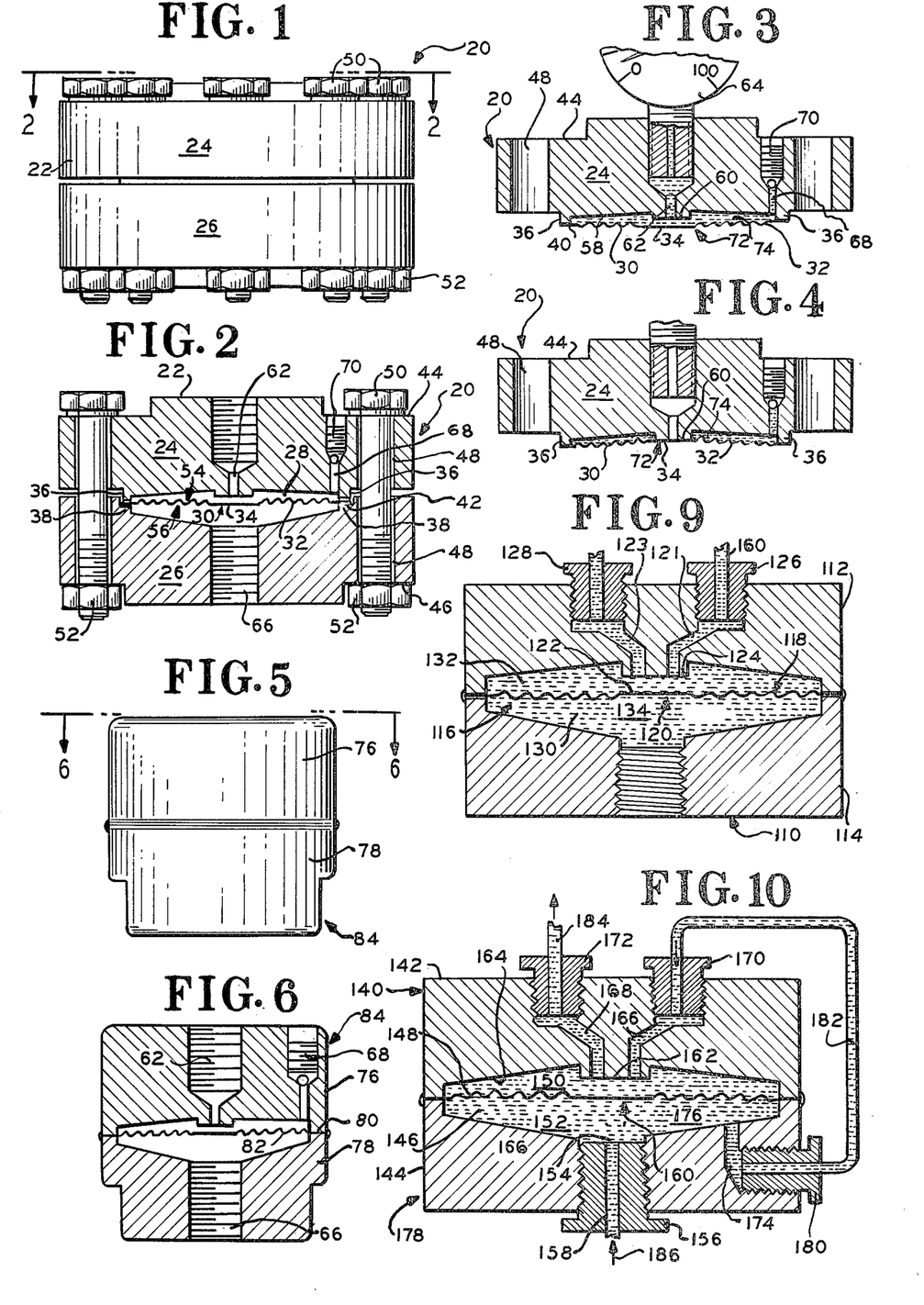
FIG. 1 is a side view of a diaphragm seal constructed in a course of the invention.
FIG. 2 is a sectional view of the diaphragm seal taken along lines 2—2 of FIG. 1.
FIGS. 3 and 4 are partially sectional schematic views of the operation of the diaphragm seal of FIG. 1.
FIG. 5 is a side view of another diaphragm seal constructed in accordance with the teachings of this invention.
FIG. 6 is a sectional view of the seal of FIG. 5 taken along lines 6—6.
FIG. 9 is a diagrammatic sectional view of a hydraulic flow control device constructed in accordance with the teachings of this invention.

Turning now to the drawing, there is disclosed a diaphragm seal 20 of the type that commonly receives at one end process media and a measuring instrument at the other end. The diaphragm seal 20 may generally comprise a housing 22. The housing 22 may, in turn, be comprised of an upper housing 24, which is usually a unit of rugged steel, or the like, and a lower housing 26, which may be made of much more expensive material as nickel, stainless steel, Monel, Hastelloy, or the like. The housing 22 may have a generally cylindrical shape with the upper and lower housings 24 and 26 comprising substantially equal axial portions of the cylinder. The upper and lower housing 24 and 26 in cross section may have any convenient shape, such as circular, and may have formed therein radially extending depressions which, when joined, form a cavity 28 (FIG. 2). It will be noted that the cavity 28 may have a generally symmetrical shape extending radially from the axial thickness of the housing 22. Preferably, this shape is circular in cross section. A diaphragm 30 (FIGS. 2, 3, and 4) may be disposed within the cavity 28. The diaphragm 30 may be made of any well known flexible material such as teflon, rubber, or a thin planar sheet metal having therein a plurality of concentric corrugations 32 extending uniformally both above and below the plane of the diaphragm 30. These corrugations 32 make the central portion of the diaphragm 30 flexible and sensitive to variations of pressure exerted upon it. At the center is a circular, uncorrugated area 34, the purpose of which will be more fully discussed below. The upper housing 24 may be provided with an annular shoulder 36, which defines the marginal edge of the upper housing portion of the cavity 28. The lower housing 26 may be provided with a corresponding step 38 (FIG. 3), which presents a lateral portion to match the shoulder 36 and an annular shoulder or circumferentially extending edge defining the marginal, radial end of cavity 28 in the lower housing 26.

The diaphragm 30 has a generally planar uncorrugated circumferential surface 40 (FIG. 3), which is gripped by the shoulder 36 of the upper housing and the step 38 of the lower housing 26. The interlocking relationship of the upper housing 24 and lower housing 26 together with the diaphragm 30 serve to seal the seal 20 against leakage at the juncture of the upper and lower housings 24 and 26, respectively. As a further measure, an annular gasket 42 (FIG. 3) may be disposed between the diaphragm 30 and the lower housing 26 and upon the step 38 to further seal the housing 22. However, while such a seal is well known, it may be replaced by a sealant made integral with the diaphragm 30, such as, for example, a Teflon ring (not shown). In a preferred embodiment, the diaphragm 30 may be welded to the periphery of the upper housing 24 so that the lower housing 26 may be disassembled from the upper housing 24 without the upper housing losing any fill. Removal, as is generally known in the art, is for the purpose of clearing the process media side of the seal 20.

The upper and lower housings 24 and 26 may be provided with flange or stepped portions 44 and 46, respectively, in the exterior circumference. These portions 44 and 46 may be drilled with holes 48 which extend parallel to the axis of the cylinder-like housing 22. Flange bolts 50 may be disposed through the holes 48. The entire unit 20 may be clamped together by tightening nuts 52 against the bolts 50 that extend from the upper housing 24 through the lower housing 26.

In assembly, it will be observed that the diaphragm 30 is secured within the cavity 28 dividing it so that there is a first chamber 54 and second chamber 56 (FIG. 2). The first chamber 54 is defined by an upper surface 58 of the upper housing 24 and the diaphragm 30 (FIG. 3). It will be noted that the upper surface 58 does not extend parallel to the diaphragm 30, but at an acute angle with the radius therein, so that the chamber 54 narrows to the periphery. This is a construction well known in the art. Extending from the axial center of the housing wall 58 may be a valve seat 60. The valve seat 60 may take any other well known configuration of a valve seat. Preferably, as here, the seat 60 is a central, cylindrical boss extending within the first chamber 54 and substantially in registry with the uncorrugated portion 34 of the diaphragm 30. To complete the valve seat 60 there may extend therethrough at least one valve port 62. The valve port 62 may be enlarged at the exterior of the upper housing internally threaded to receive a fitting which may interconnect with, for example, a pressure sensitive instrument 64 (FIG. 5) such as a bourdon tube or the like.

Axially disposed in the lower housing 26 may be a second chamber port 66 (FIG. 2). It will be observed that the diameter of the second chamber port 66 may be substantially larger than the valve port 62 in the upper housing 26. The purpose for this will be more fully disclosed below.

At the radially extending periphery of the cavity 28 and extending through the upper housing 24, parallel to the axis thereof, may be a bleed port 68. The bleed port 68 may be enlarged at the upper position as it exits from the upper housing 24 to admit a ball check valve 70. The function of the bleed port 68 will be more fully discussed below.

As previously indicated, the valve seat 60 of the valve 72 is in registry with a center portion 34 of the diaphragm 30. The combination of this center portion or valve member 34 and the valve seat 60 may be referred to as a valve 72 (FIGS. 3 and 4). The uncorrugated portion 34 of the diaphragm 30 has, as previously discussed, a generally planar surface which may be rigidized by a thickening of the diaphragm 30 itself or by the addition of a sealing material such as teflon, rubber, or the like, thereby forming the valve member 34. This valve member 34, when coming in contact with the valve seat 60, serves to close the valve 72.

The valve member 34 and matching valve seat 60 may take any other well known configuration. Thus, for example, the valve seat 60 may be furnished with an annular rim (not shown), which digs into the valve member 34 to assure a firm closing. Alternatively, the valve member 34 may be furnished with a protruding dimple or conical point which enters the port 62 to again assure a tight closing.

Once assembled with the diaphragm 30 disposed between the upper and lower housings 24 and 26 and the housings 24 and 26 secured in place by the flange bolts 50 and nuts 52 and the measuring instrument 64, such as the bourdon tube, secured to the valve port 62, the entire first chamber 54 is filled with a liquid 74 (FIG. 3), which may be, for example, oil or the like. Filling may be accomplished by entering the liquid 74 through the valve port 62 (prior to the addition of the instrument 64) or through the bleed port 68. In either case, the bleed port 68 may be used to remove air from the first chamber 54. The smooth recessed lower suface 58 of the upper housing 24 assures the easy flow of entrapped air bubbles to the outer periphery of the first chamber 54 and the bleed port 68. Thus, the device of this invention, as more fully discussed below, makes possible a bleed port 68 at the periphery of the cavity 28 so that air migrating to that part may be easily removed. In the prior art, bleed ports could not be, it is believed, located at the periphery of a cavity, making such evacuation difficult, if not impossible. It is believed that air could easily become entrapped between the valve port and the periphery of the cavity caused by the bleed port location and/or the matching housing convolutions.

In operation, pressure upon the diaphragm 30 results in pressure upon the liquid 74 in the first chamber 54. This pressure is transmitted to the instrument 64 through the valve port 60. If there is a loss of fill, which may be caused, for example, by a rupture in the connection between the instrument 64 and the housing 22, or the removal of the instrument 64, or distortion of the instrument 64 or connection thereto, the diaphragm 30 will be forced upwardly and the valve 72 will close. As a result of this closing of the valve 72, liquid 74 will be entrapped between the diaphragm 30 and the upper housing wall 58. It will be immediately observed that the liquid 74 so entrapped immediately conforms to both the space and the corrugations 32 of the diaphragm 30. Because the liquid 74 is substantially noncompressible, there is formed a totally conforming buffer, barrier, or stop to the diaphragm 30 with the forces equally distributed throughout. Effectively, the diaphragm 30, by means of the liquid 74, becomes an integral part of the upper housing wall 58 and, therefore, will remain intact. If the valve seat 60 and diaphragm 30 are disposed so that the valve member 34 is seated within the elastic limit of the diaphragm 30, the diaphragm will remain undistorted and resilient, ready for renewed use once the lost liquid or integrity of the connection to the instrument 64 is restored. The pressure rating with which the valve 72 closes is dependent upon the pressure applied, the spring rate of the diaphragm 30, and the distance of the diaphragm valve member 34 from the seat 60.

In the prior art devices, no proper barrier existed between a diaphragm and housing wall. Thus, as previously indicated, it was not possible to place a bleed port at the periphery. In the prior art devices, pressure from the media in the second chamber might cause the diaphragm to enter the bleed port and become damaged. Thus, in filling the diaphragm seal, it now becomes possible to either mechanically cause the entrapped air to leave through the bleed port by moving the diaphragm 30 up and down slowly as oil is filled through the central port 62, or to draw off the air by a vacuum pump in a manner well known in the art. As indicated in the previous discussion, it had often been necessary to provide an intricate design to the upper housing itself, including special radially extending channels so that the air could be drawn out through the center. This is no longer required in the invention disclosed herein.

Another valuable feature of the invention disclosed herein is the ability to weld the diaphragm 30 within the housing at the very periphery. In the past, most diaphragm seals were secured by clamps or bolts, as previously discussed. However, this invention lends itself to have the upper and lower housings 76 and 78, respectively, grip the outer uncorrugated surface 80 of a diaphragm 82 (FIG. 5). The unit 84 (FIGS. 5 and 6) may be assembled by welding the diaphragm 82 to the housing sections 76 and 78 by such well known means as electron beam or laser welding. The resulting assembly is simpler in design and much more economical than the current bolted up design. Therefore, the resulting device is of a much more simplified design. Of course, the lower housing 78 of this invention cannot be removed for cleaning out the process media. This design is best suited where upper and lower housings may be made of similar materials. The resulting savings in material by the elimination of flanges is an economy in its manufacture and results in a smaller sized unit. Further, the welding eliminates all possibility of leakage for both the fill and media side of the housing.

Figure 7:
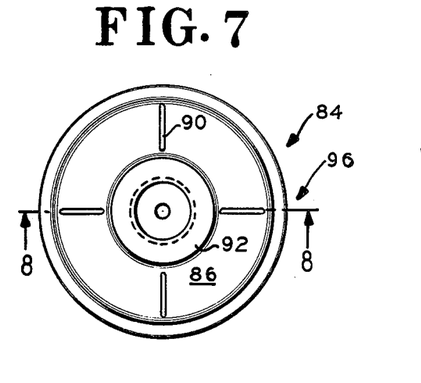
FIG. 7 is a top view of another diaphragm seal constructed in accordance with the teachings of this invention.
Figure 8:
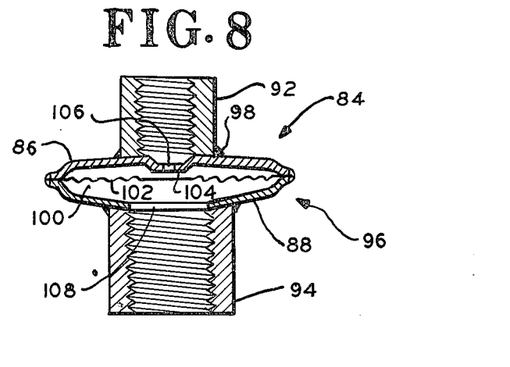
FIG. 8 is a sectional view of the seal of FIG. 7 taken along lines 8—8.

Still another embodiment 84 (FIGS. 7 and 8) of this invention provides for the welding of upper and lower housings 86 and 88 in a manner well known in the art. The housing walls, which are, as indicated, made from stampings, may have ribs 90 (FIG. 7) therein for purposes of strengthening and reinforcing the housing. Members such as, for example, casting or machine parts 92 and 94 on both the instrument and the media sides of the diaphragm seal 96 may be inserted within suitably disposed apertures in the upper and lower housings 86 and 88, respectively, and then joined, as by welding 98 in place. It is preferred that the members 92 and 94 and stampings 86 and 88 be of the same material. Secured within the housing cavity 100 is a diaphragm 102. The upper casting 92 is so formed as to provide a valve seat 104 with a valve port 106. The casing 92 is threaded to accept a threaded fitting (not shown). The lower housing casting 96 has a second chamber port 108 for admitting media. Because of the means of fabricating the housings 86 and 88, a bleed port (not shown) may be added, as by welding thereto by still another casting. This device operates in the same manner as other embodiments herein and offers the advantage of inexpensively fabricated components. Furthermore, this device is believed to be so inexpensive as to justify its use as a disposable unit.

Very often, it is desirable to apply more than one instrument to a diaphragm seal. In the past, this was accomplished by means of a "T" connection extending from the seal. The principles of this invention make for a much more convenient and, it is believed, economical construction. Thus, a seal 110 (FIG. 9) may comprise joined upper and lower housings 112 and 114. A cavity 116 within the housings 112 and 114 may have a diaphragm 118, of similar construction as the previous diaphragms 30, 82, and 102 discussed herein, secured between the housings 112 and 114. A valve 120, comprising the diaphragm valve member 122 and a valve seat 124, operates as before. Here, however, the seat 124 has two valve ports 121 and 123. The valve ports 121 and 123 may separate from each other in a "Y" configuration so that they may be enlarged to receive fittings 126 and 128 therein. The operation of this embodiment (FIG. 9) remains on the same principle as the other embodiments herein. The two valve ports 121 and 123 give access to two instruments (not shown), thereby replacing the "T" connection. On the other hand, this construction gives rise to still another use — as a flow control in which a diaphragm 118 controls the flow of liquids through the valve ports 121 and 123. The valve 120 closes when pressure in the second chamber 130, as previously described, is greater than the spring rate of the diaphragm and opposing pressure in the first chamber 132. In this manner, there is provided a differential control valve 110 for the flow of a liquid 134 through the housing 112. In addition, if there is a loss of pressure on either side of the valve ports 121 or 123, the valve 120 will close, sealing and preventing excessive loss of liquid in the lines connected thereto. Thus, this device acts as a safety or control valve for the lines.

The concept of using the device of this invention as a flow-through control lends itself to yet another embodiment. A housing 140 is comprised of an upper and lower housing 142 and 144, respectively, and defining therewithin the cavity 146. Clamped between the upper and lower housing 142 and 144 may be a diaphragm 148, having the same substantial configuration of the prior devices herein and secured to the housings 142 and 144, as by welding. The diaphragm 148 therein divides the cavity 146 into first and second chambers 150 and 152, respectively. The lower housing 144 may have disposed therein an entry port 154 with a fitting 156 secured therein. The fitting 156 may be employed to secure a pipe 158 or other conduit to the housing 140. As in the previously discussed embodiment (FIG. 9), there is a valve 160, which comprises a valve seat 162, which forms an integral part of the upper housing wall 164 of the first chamber 150 of the cavity 146 and a valve member 166, formed as an integral part of the diaphragm 148. The seat 162 may have, as previously described, two ports 167 and 168, respectively. As with the previous embodiment having two valve seat ports (FIG. 9), the ports 167 and 168 within the upper housing 142 may have a generally "Y" shaped configuration so that the conduit path may be enlarged to receive therein fittings 170 and 172, respectively. The second chamber 152 may, in addition to its entry or upstream port 154, have an exit or downstream port 174. The location of the second chamber downstream port 174 may be at any convenient location. Preferably, the port 174 is located to one side of the second chamber upstream port 154. The second chamber upstream port 154 is centrally disposed to give, it is believed, a more efficient distribution of the forces of pressure provided by a liquid 176 circulated through the device 178.

The second chamber downstream port 174 may be "L" shaped, extending out of the cavity 146 and at the side of the housing 140. At its exit from the housing 140, the port 174 may be enlarged to receive a fitting 180. This fitting 180 may secure a conduit 182 to the second chamber downstream port 174. This conduit 182 is, in turn, connected to the upstream valve port 167 by the fitting 170 associated therewith. The fitting 172 in the downstream valve port 168 secures a conduit 184 to the downstream valve port 168. Thus, it will be seen that there is provided a communication between the second chamber 152 and the first chamber 150 by means of the conduit 182.

In operation (FIG. 10), a flow of liquid (which may be any suitable hydraulic liquid) is established through the upstream second chamber port 154 in the direction of the arrow 186. The flow will continue through the second chamber 152, out the downstream port 174, through conduit 182, through upstream valve port 167, through the first chamber 150, and out the downstream valve port 168 and conduit 184. As long as the flow of the liquid is in the direction of the arrow 186, and as long as the spring rate (i.e., the pressure necessary to deflect the diaphragm to a closed position of the diaphragm 148 and the pressure between the valve seat 162 and the diaphragm valve member 166 remains at least as great as the pressure of the liquid against the valve member 166 in the second chamber 152, the valve 160 will remain open and the flow will continue. Let us assume for the moment, however, that, for some reason, the pressure drops significantly at the downstream valve port 168 because, for example, of a line rupture or intentional opening of the line. In that instance, it is preferred that the liquid 176 runs out of the downstream port 168 at a greater rate than it enters the first chamber 150 through the upstream port 167. The pressure in the first chamber 150 will drop until the spring rate of the diaphragm 130 is overcome by the pressure on the second chamber 152 and the valve 160 will close, sealing off the upstream conduit 186 from the downstream conduit 184. It will be noted that the downstream valve port 168 has a comparatively larger volume than the upstream valve port 167. This relationship is considered preferable to encourage the rapid removal of liquid 176 and closing of the valve 160, once the system has begun to lose liquid on the downstream side 184. Obviously, a rapid flow out will not be easily made up by the slower flow into the first chamber 150. Upon the pressure in the second chamber 152 dropping below the predetermined valve closing pressure, the valve 160 will reopen. Thus, the operation of the unit will repeat. Thus, in a brake system where pressure in the second chamber 152 may drop, permitting valve 160 to open, a return of pressure will cause the valve 160 to close and prevent a further loss of liquid. If a gas were to be used in the valve devices of FIGS. 9 or 10, instead of a liquid, the entrapping function would not be as important. Instead, the valve 160 can be designed so that the diaphragm 148 deforms under pressure, closing the valve 160, sealing off the system.

The valve device of FIG. 10 is believed particularly useful in multi-lines in such control systems as in which the liquid, usually an oil, is intended to drive brakes of an automobile, controls of aircraft, or the like. Should a break occur in the downstream line, a great deal of the brake liquid can be saved and the operating integrity of the remainder of the system preserved by virtue of the valve closing.

Figure 11:
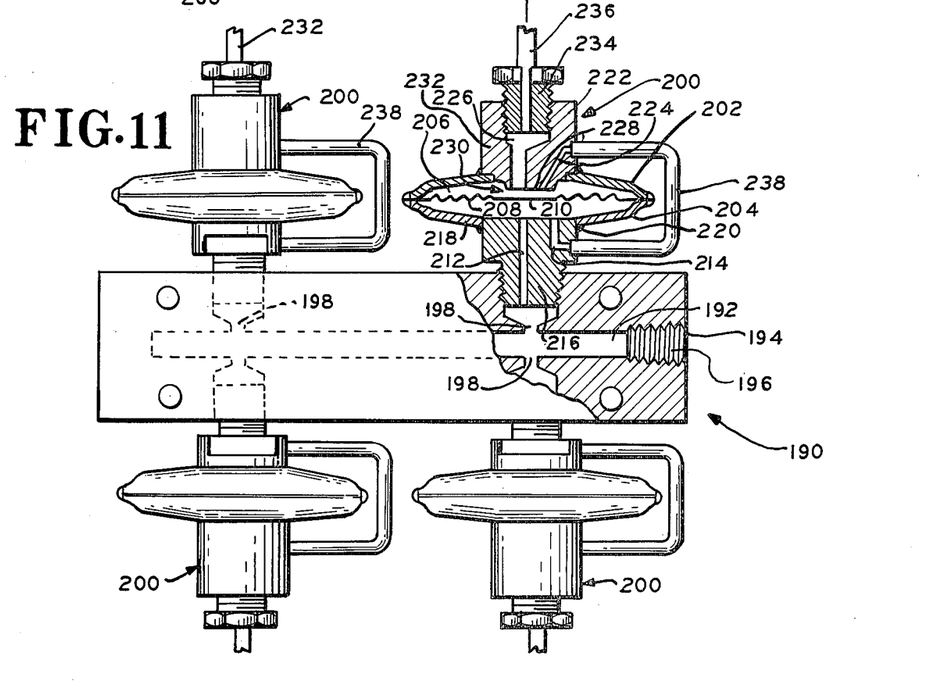
FIG. 11 is partially sectioned side view of another flow control device constructed in accordance with the teachings of this invention.

One example of the uses of the flow control, in which the break in the downstream side of a line allows the valve to close and thereby protect an overall system, may be provided with a plurality of such valve devices integrally joined to a manifold device 190 (FIG. 11). The manifold 190 may take any convenient shape, as, for example, a substantially metallic rectangular body member having a centrally disposed conduit 192 formed therein as by drilling or casting. The conduit 192 may exit at one end 194 of the manifold 190. This exit of the manifold conduit 192 may be provided with a threaded portion 196 to receive a fitting (not shown). This end 194 represents the upstream portion of the manifold. The downstream end of the manifold conduit 192 terminates in a plurality of manifold branches 198. Each branch 198 forms a downstream port of the manifold 190 and is so dimensioned as to receive, at its exit, a fitting. The fitting in each instance herein comprises a valve control unit 200. Each unit 200 operates on the flow control principles of the previously described embodiment 178. Thus, if one of these units 200 is described, the same description will suffice for all other units 200. As with prior devices herein, each unit may comprise upper and lower housings 202 and 204, respectively, which have therein a cavity 206. A diaphragm 208, having a centrally disposed valve member 210 (as previously described), is secured between the upper and lower housings 202 and 204. For simplicity and economy of manufacture, the housings 202 and 204 may be formed by a combination of stampings and castings, as indicated in connection with the device of FIG. 7. Thus, the second chamber upstream and downstream ports 212 and 214 may be formed as an integral part of a casting 216 included to fit within an aperture in the remainder of the lower stamping 218. The juncture of the second casting 216 and the lower stamping 218 may be sealed as by, for example, welding 220 or similar joining means at the periphery. The upstream second chamber port 212 exits through a portion of the second casting 216, having a general fitting configuration to be secured to the manifold 190.

A first casting 222 has therein the upstream and downstream valve ports 224 and 226. The upstream port 224 may, for example, enter the first casting 222 at a side while the downstream valve port 226 exits through an end of the generally cylindrical first casting 222. The lower portion of the first casting 222 may be shaped to form the valve seat 228 of the valve 230. This first casting 222 is disposed within a stamping 232, forming the remainder of the upper housing 202. As indicated in the fabrication of a previous embodiment of stamping and castings (FIGS. 7 and 8), the diaphragm 208 and stamping 218 and 232 are joined, as by welds 220.

The valve downstream port 226 may be so enlarged as to receive a fitting 234. The fitting 234 retains a downstream conduit 236. The downstream second chamber port 214 may be interconnected to the upstream valve port 224 by means of a conduit 238 which may be inserted within each casting 216 and 222 and joined, as by welding.

In operation, should any line 236 suddenly lose pressure or liquid, the valve 200 would close, protecting the remainder of the system from loss of fluid.

Figure 12:
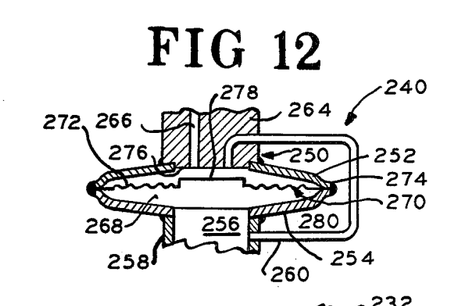
FIG. 12 is a schematic sectional view of another flow control device constructed in accordance with the teachings of this device.

Still another embodiment of this invention is related to the necessity of controlling the sealing or seating of a diaphragm to close or valve a line. It will be observed that central to the previous embodiments is the fact that liquid is entrapped between the diaphragm and the housing wall when the diaphragm valve member seats, thereby cushioning and protecting the diaphragm. This cannot be overlooked as an essential ingredient to the invention herein, in that the liquid entrapped protects the disphragm against damage. This damaging of the diaphragm has been an essential difficulty of main devices and particularly of diaphragm seals. Still another approach, however, is to control the seating of the diaphragm so that it deforms intentionally and purposely, thereby permanently sealing the system. Thus, while rupture is avoided, permanent distortion of the diaphragm is not. The result is a disposable control device 240 (FIG. 12). Thus, for example, there may be provided a housing 250 comprising an upper and lower housing 252 and 254. As disclosed, a main portion of these housings 252 and 254 may be in the form of stampings or any other convenient form (as, for example, the bolted up part arrangement). An upstream second chamber port 256 may extend through a second casting 258 welded to the lower housing stamping 254. This casting 258 may have, as an integral part thereof or welded thereto, a downstream conduit 260 for communicating with the first chamber 262 and casting 264. A downstream valve port 266 may extend through the casting 264 from the first chamber 262 of the housing cavity 268. As in previous devices herein, the cavity 268 is divided by a diaphragm 270. The diaphragm 270, which has a plurality of concentric corrugations 272, is joined and held at its circumference by the upper and lower housings 252 and 254. The first casting 264 may be somewhat recessed within the upper housing wall 274, thereby forming, for example, a substantially cylindrical depression 276 within the upper housing wall inside the chamber. The diaphragm 270 may have a matching cylindrical boss 278, which is in registry with the cylindrical depression 276. It is believed that the diaphragm 276 may be so disposed, such that when the pressure in the second chamber 280 becomes great enough to force the diaphragm 270 against the first chamber depression 276, the cylindrical boss 278 may insert itself within the cylindrical depression 276, permanently sealing shut the unit. In this embodiment, the unit has a one-time use, valving or closing the system against further use in the future. The corrugations 272 of the diaphragm 270 are so disposed, such that, while they abut the upper housing wall 274 when the valve closes, it is immediately sealed shut without rupturing. This may be accomplished by appropriately dimensioning the diaphragm 270 so that the portions against the wall 274 may, indeed, distort the diaphragm 270, but will not cause the diaphragm to buckle or split open. There is no need, however, to shape the upper housing wall 274 to conform to the corrugations or shape of the diaphragm. Of course, here it is not considered essential that liquid be trapped between the diaphragm and the housing.

Figure 13:
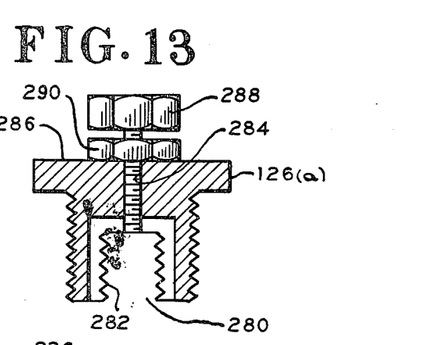
FIG. 13 is a schematic sectional view of a bellows device for controlling the position of a diaphragm.

Still another device is suggested by the dual valve ports 121 and 123 (FIG. 9) when used as a diaphragm seal. There have been provided, in the past, means for adjusting the upper limit of a pressure instrument. A simplified method may be provided by assembly of a fitting 126(a) (FIG. 13) for insertion in, for example, the upstream valve port 121 of the dual valve port unit 110. The fitting 126(a) may be, for example, generally hollow, having secured across the opening 280 a bellows 282 of, for example, metal which also opens into the port 121.

The liquid in a cavity 132 would enter the bellows 282. An aperture 284, in the upper, closed end 286 of the fitting 126(a), has extending therethrough an adjusting means, as, for example, a threaded screw 288, releasably held in place by a locknut 290. In operation, pressure is applied to the process side 130 of the diaphragm 118 (FIG. 9), until a maximum gauge reading is obtained. The screw 288 (which has been tightened down upon the bellows 282) is released, until the diaphragm 118 is so positioned as to close valve 120 at the desired pressure, thereby protecting the instrument (now shown) from damage or rupture.

Figure 14:
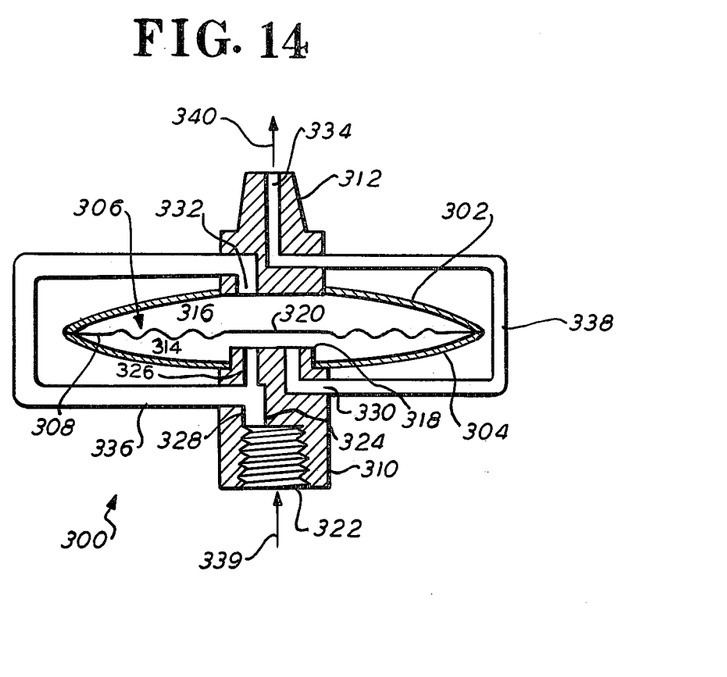
FIG. 14 is a schematic of another device constructed in accordance with the teachings of this invention.

In still another embodiment, there is provided a valve device 300 (shown in schematic form in FIG. 14). This valve device 300 may be constructed in accordance with the teachings of any of the prior art devices herein. Preferably, the type of construction shown in connection with the devices 84 of FIG. 8 or 240 of FIG. 12 may be used, wherein castings and stampings are employed. The stampings 302 and 304 may take the form of a generally disc shape, defining a cavity 306 therebetween. A diaphragm 308, having the same or similar construction as other diaphragms discusses herein before, may be disposed between the upper and lower housings 302 and 304, respectively, and the combination joined or secured together, as by welding or the like. The upper and lower housing 302 and 304, respectively, may have centrally disposed apertures therein. Secured in the apertures, and completing the cavity 306 on opposed sides of the diaphragm 308, are members 310 and 312, respectively, which may be made from castings or machine parts and joined, as by welding or the like in place. Thus, the diaphragm 308 divides the cavity 306 into two chambers 314 and 316, respectively. The first member 310 may be so formed as to define within the first chamber 314 the valve seat 318, which serves the same function as the valve seats in the previously discussed devices herein. Accordingly, the diaphragm 308 is provided with a centrally disposed valve member 320.

The first member 310 may have a threaded opening 322, so as to receive a fitting (not shown). Communicating with the threaded opening 322 and into the first chamber 314 is a conduit or portal path 324, the lower portion of which is necked down to a narrower diameter, as at 326. The larger diameter portion 328, which interconnects the threaded portion or opening 322 with the narrow diameter portion 326, also exists from the side of the first member 310. The function of this portion of the larger diameter path 328 will be more fully explained below. The narrower portal path 326 provides an opening through the valve seat 318 into the first chamber 314. In a similar manner, a second portal 330 is provided in the valve seat 318 and extends out through the first member 310. The function of the second portal 330 will be more fully explained hereinafter.

On the opposed side of the diaphragm 308 and completing the second chamber 316 may be the second member 312, which has therethrough a port 332. This second chamber portal 332 preferably has the same diameter as the larger diameter portion 328 of the first port 324 of the first chamber 314 and extends from the second chamber 316 and through the second member 312. As will appear below, while not entirely essential, a conduit path 334 may be provided through the second member 312, exiting therefrom. A conduit 336 may be provided interconnecting the larger diameter port 328 with the second chamber port 332. This conduit 336 may be secured to the first and second members 310 and 312, as by welding or the like. Its cross-sectional area is preferably equal to that of the first chamber larger area portal 328 and the second chamber port 332.

In a like manner, a second conduit 338 may interconnect the second first chamber portal 330 and the conduit path 334 passing through the second member 312. Obviously, the conduit 334 may merely exit from the first member 310, if desired, without passing through the second member 312.

In operation, the threaded opening 322 may be inserted into a source of upstream pressure (represented by the arrow 338). The pressure may be any type of fluidic pressure. Thus, in the example discussed herein, in a hydraulic system, such as found in brakes on automobiles or trucks, a master piston (not shown) may provide pressure in a direction shown by the arrow 338. Fluid (e.g. a liquid), passing through the device 300, would pass out of the conduit channel 334 in the second member 312, in the direction of the second arrow 340. It will be immediately apparent that a sudden surge of fluidic pressure entering at the threaded opening 322, if greater than the spring rate of the diaphragm 308 and larger than the back pressure provided by the brakes (for example), would be fed through the larger diameter portion 324, 336, and 332 into the second chamber 316. As a result, the diaphragm valve member 320 may be caused to close against the valve seat 318, thereby cutting off the flow. When the back pressure upon the downstream conduit paths 330, 338, and 334 is sufficiently large, it would overcome this surge of pressure, reopening the valve to a flow of fluid. There is, thus, provided a feedback system for sensing surges in pressure against which the system may be wished to be protected. It is also apparent that, if there is a leakage in the downstream section (i.e. the line attached to the conduit path 334), the greater pressure on the upstream portion would be substantially fed into the second chamber 316, closing the valve device 300.

One application of a device of this construction would be to those, for example, of an automobile or truck braking system. There have been proposed complicated and expensive systems intended to prevent a skidding wheel from becoming locked. Usually, such systems are provided with electronic systems of high degrees of complexity. A plurality of the device 300 of this invention, secured to, for example, the manifold 190 (FIG. 11), would provide a similar result as these systems, with an economic advantage. For example, if one assumes that each of the lines 232 (of FIG. 11) are connected to the conduit path 334 for each of the devices 300 (which are, in turn, secured to the manifold 190), any leaking in any one of the lines 232 (leading to a brake) would cause the device 300 to close, as indicated above. Just as importantly, however, there would also be provided a means for adjusting the pressure on any single wheel of the vehicle. Thus, if one supposes that one wheel of the vehicle begins to spin freely, the back pressure on that line 232, provided by the wheel, would be reduced substantially. As a result, the upstream pressure, by comparison, may surge or increase, closing the valve 300. At the same time, the remaining lines 232, which were in balance, remain open. Thus, pressure from the master piston would not be delivered to the spinning wheel until such time as the wheel engaged the surface of the road and could apply the back pressure necessary to reopen the valve 300. As might be expected, the effected valve device 300, on its particular line, stutters, or opens and closes, as the pressure builds up and drops, while pressure to the other wheels is constant. This is precisely the action desirable in an effort to prevent trucks or cars from swerving.

It will be appreciated that the principles of the inventions disclosed herein may be applicable to other shaped devices having desired configurations. The valve may be located at other positions in a cavity having any other desired configuration. Thus, for example, it is possible to have a device housing in which the valve member is in registry with two valve seats — one in the first chamber and one in the second chamber, thereby making a system responsive to pressures exerted in either chamber.

What is claimed:

1. A control mechanism of the type employing a liquid therein, comprising:
   (a) a housing comprising upper and lower housing members of rigid material having a cavity; said cavity having a symmetrical configuration;
   (b) a generally symmetrically shaped diaphragm secured between said upper and lower housings, thereby dividing said cavity into at least a first and second chamber; the first chamber being adapted to receive therein the liquid;
   (c) a valve member formed in a central portion of said diaphragm;
   (d) a boss extending from within said first housing and forming a valve seat; said housing having a first conduit port extending through said boss for admitting the liquid into said first chamber; said valve member being in registry with said valve seat; valve seat having a substantially planar end for abutting said valve member to form said valve; said valve seat being so spaced from said diaphragm such that, upon said valve closing, said diaphragm being within its spring rate; said diaphragm having a plurality of concentric convolutions about said valve member; said valve member being coated with Teflon for sealing shut said valve; said valve being disposed substantially at the symmetrical center of said cavity;
   (e) said diaphragm, in combination with said housing wall, comprising means for entrapping within said first chamber and so disposed such that, upon a result of force being applied in a predetermined direction to said diaphragm and said valve closing, said entrapping means, as a result of the force, thereby entrapping at least a part of the liquid within said first chamber, so that the entrapped liquid prevents the diaphragm means from being damaged by the force, thereby entrapping at least a part of the liquid within said first chamber, so that the entrapped liquid provides a cushion and hydrostatic stop to prevent said diaphragm from being damaged by the force;
   (f) said housing having a second chamber port for communicating a substance through said second chamber to thereby move said diaphragm to thereby operate said valve; and
   (g) said housing having a bleed port at the periphery of said cavity and extending through said upper housing for filling liquid therein or removing air from said chamber.

2. A control mechanism as recited in claim 1, further comprising a check valve in said bleed port.

3. A control mechanism of the type employing a liquid therein, comprising:
   (a) housing means having a cavity therein;
   (b) diaphragm means coupled within and dividing said cavity into at least a first and second chamber, said first chamber being adapted to receive therein the liquid; said cavity having a generally circular cross section in a plane coincident with said diaphragm means; said housing having a bleed port at the circumference of said cavity, through said housing, and into said first chamber; and
   (c) means for entrapping within said first chamber and being so disposed such that, upon a resultant force being applied in a predetermined direction to said diaphragm means, said entrapping means, as a result of the force, thereby entrapping at least a part of the liquid within said first chamber, so that the entrapped liquid prevents said diaphragm means from being damaged by the force.

4. A control mechanism as recited in claim 3, wherein said bleed port further comprises a check valve.

5. A control device of the type employing a liquid therein, comprising:
   (a) housing means having a cavity therein;
   (b) diaphragm means secured within said cavity and dividing said cavity into first and second chambers;
   (c) said housing cavity having a generally symmetrical shape with a centrally disposed port for admitting the liquid into and out of said first chamber; and
   (d) bleed port located at the periphery of said first chamber within said housing, so as to remove air from said housing chamber as the liquid is entered into said first chamber.

6. A control device as recited in claim 5, wherein the cavity has a generally circular cross section and said bleed port is located at the circumference thereof.

* * * * *